US011859631B2

(12) United States Patent
Grosso et al.

(10) Patent No.: US 11,859,631 B2
(45) Date of Patent: Jan. 2, 2024

(54) ROTOR STRUCTURE FOR A TURBOMACHINE WITH VENTING/SEALING ARRANGEMENT IN TIE BOLT

(71) Applicant: Siemens Energy Global GmbH & Co. KG, Munich (DE)

(72) Inventors: Glenn R. Grosso, Olean, NY (US); Brian Grosso, Olean, NY (US)

(73) Assignee: SIEMENS ENERGY GLOBAL GMBH & CO. KG, Munich (DE)

( * ) Notice: Subject to any disclaimer, the term of this patent is extended or adjusted under 35 U.S.C. 154(b) by 0 days.

(21) Appl. No.: 17/779,584

(22) PCT Filed: Feb. 26, 2020

(86) PCT No.: PCT/US2020/019779
§ 371 (c)(1),
(2) Date: May 25, 2022

(87) PCT Pub. No.: WO2021/173124
PCT Pub. Date: Sep. 2, 2021

(65) Prior Publication Data

US 2023/0003225 A1 Jan. 5, 2023

(51) Int. Cl.

| | |
|---|---|
| ***F04D 29/10*** | (2006.01) |
| ***F04D 29/04*** | (2006.01) |
| ***F04D 29/043*** | (2006.01) |
| ***F04D 29/08*** | (2006.01) |

(52) U.S. Cl.
CPC ......... *F04D 29/104* (2013.01); *F04D 29/043* (2013.01); *F04D 29/083* (2013.01); *F05D 2240/61* (2013.01)

(58) Field of Classification Search
CPC ............................ F04D 29/104; F04D 29/043
See application file for complete search history.

(56) References Cited

U.S. PATENT DOCUMENTS 3,909,012 A 9/1975 Denis et al.
4,057,371 A * 11/1977 Pilarczyk ............ F04D 29/0513 417/409
4,863,342 A * 9/1989 Nordstrom ............ F01D 11/025 415/189

(Continued)

FOREIGN PATENT DOCUMENTS

EP 2381109 A2 10/2011
EP 3264011 A1 1/2018

OTHER PUBLICATIONS

PCT International Search Report and Written Opinion of International Searching Authority dated Nov. 16, 2020 corresponding to PCT International Application No. PCT/US2020/019779 filed Feb. 26, 2020.

*Primary Examiner* — Long T Tran

(57) ABSTRACT

Rotor structure for a turbomachine, such as a centrifugal compressor is provided. Disclosed embodiments make use of venting/sealing arrangements effective for venting a tie bolt rotor so that, for example, an incipient leakage of a process fluid can be monitored. Additionally, in operation disclosed embodiments are effective to, for example, convey to the tie bolt a pressurized sealing fluid effective for reducing the likelihood of process fluid escaping to the atmosphere.

12 Claims, 3 Drawing Sheets

(56) References Cited

U.S. PATENT DOCUMENTS

| | | | | |
|---|---|---|---|---|
| 5,883,448 | A * | 3/1999 | Zimmerman | H02K 9/12 310/58 |
| 2002/0104316 | A1* | 8/2002 | Dickey | F23R 3/26 60/752 |
| 2003/0070633 | A1* | 4/2003 | Al Hawaj | F04B 1/205 123/56.1 |
| 2016/0053688 | A1* | 2/2016 | Suciu | F01D 25/12 415/177 |
| 2018/0100514 | A1* | 4/2018 | Venkataraman | F04D 29/00 |
| 2020/0157961 | A1* | 5/2020 | Rodriguez Erdmenger | F01D 11/001 |
| 2020/0157964 | A1* | 5/2020 | Rodriguez Erdmenger | F01D 11/04 |

* cited by examiner

ROTOR STRUCTURE FOR A TURBOMACHINE WITH VENTING/SEALING ARRANGEMENT IN TIE BOLT

BACKGROUND

1. Field

Disclosed embodiments relate generally to the field of turbomachinery, and, more particularly, to a rotor structure for a turbomachine, and, even more particularly, to a venting/sealing arrangement in a tie bolt.

2. Description of the Related Art

Turbomachinery is used extensively in the oil and gas industry, such as for performing compression of a process fluid, conversion of thermal energy into mechanical energy, fluid liquefaction, etc. One example of such turbomachinery is a compressor, such as a centrifugal compressor.

DETAILED DESCRIPTION

Figure 1:
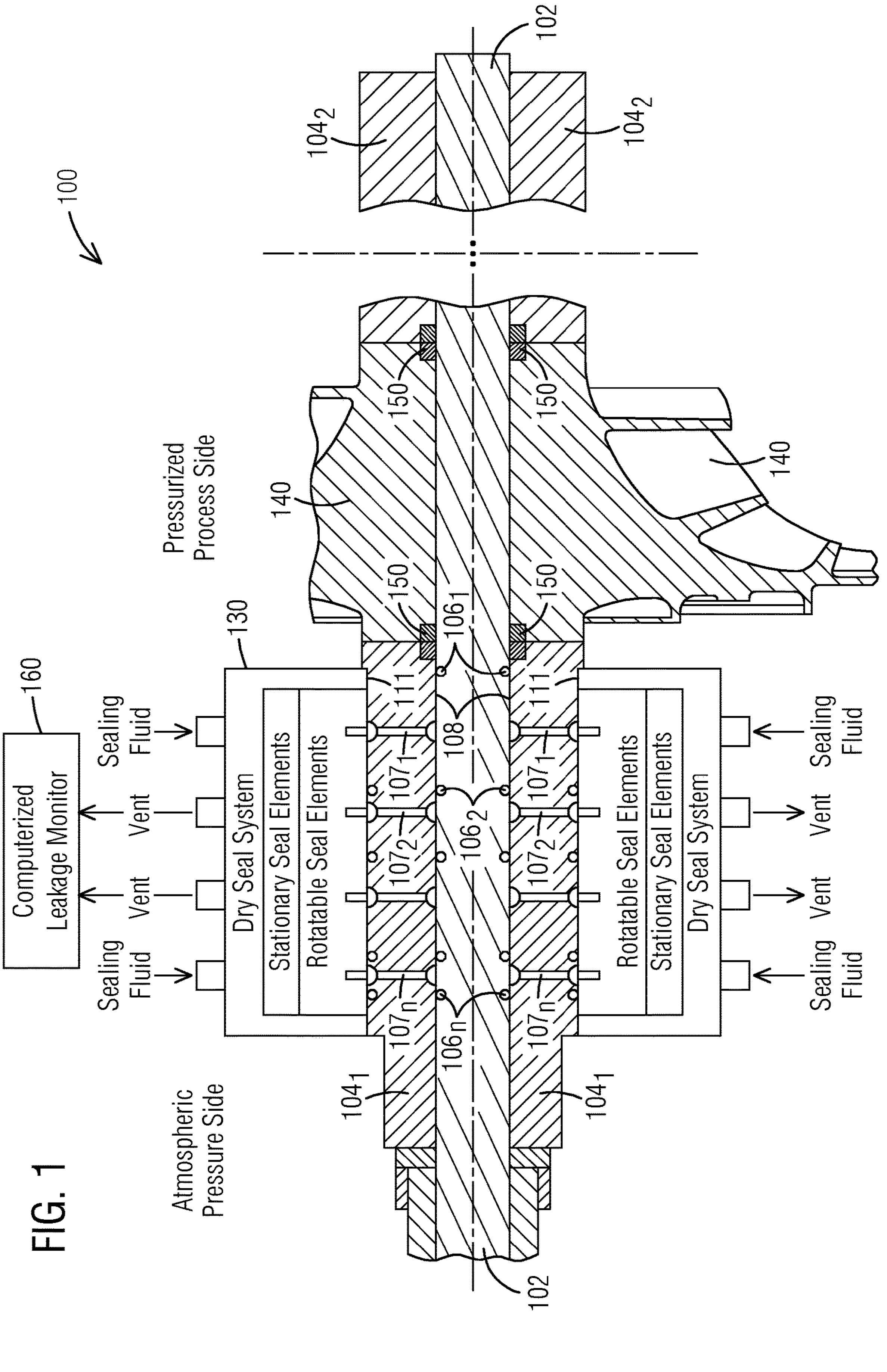
FIG. 1 illustrates a fragmentary cross-sectional view of one non-limiting embodiment of a disclosed rotor structure, as may be used in industrial applications involving turbomachinery, such as without limitation, centrifugal compressors.

As would be appreciated by those skilled in the art, turbomachinery involving rotors of tie bolt construction (also known in the art as thru bolt or tie rod construction) need to be sealed so that a process fluid (which could be flammable or otherwise hazardous) and which is pressurized by a turbomachine (e.g., a compressor) is inhibited from escaping to the atmosphere. In certain known rotor structures, this sealing is typically done using one or more seals (e.g., O-rings) disposed between the tie-bolt and the bore of a shaft section of the rotor. A respective O-ring may thus be subject to the process fluid internal pressure on one side and to atmospheric pressure on the other side. The present inventors have recognized that such known rotor structures lack features that would allow monitoring an incipient leakage of the process fluid about the tie bolt. Additionally, such known rotor structures lack features that would allow conveying a sealing fluid (such as a dry sealing fluid) about the tie bolt.

Disclosed embodiments make use of an innovative venting/sealing arrangement providing reliable and cost-effective venting/sealing backups and/or venting/sealing redundancies, such as with features that may be effective for venting about the tie bolt so that, for example, an incipient leakage of the process fluid can be monitored and in turn malfunctioning seals can be appropriately and timely replaced before escalating to an undesirable condition. The venting may be carried out by way of a conduit—drilled or otherwise constructed through a stub shaft—that under certain operational conditions effectively functions as a vent. Additionally, such features may be effective for conveying an appropriately pressurized sealing fluid about the tie bolt effective for reducing the likelihood of the process fluid escaping to the atmosphere. The conveying of the sealing fluid to the tie bolt may be carried out by way of another conduit—similarly drilled or otherwise constructed through the stub shaft—that under certain operational conditions effectively permits conveying the sealing fluid to the tie bolt.

In the following detailed description, various specific details are set forth in order to provide a thorough understanding of such embodiments. However, those skilled in the art will understand that disclosed embodiments may be practiced without these specific details that the aspects of the present invention are not limited to the disclosed embodiments, and that aspects of the present invention may be practiced in a variety of alternative embodiments. In other instances, methods, procedures, and components, which would be well-understood by one skilled in the art have not been described in detail to avoid unnecessary and burdensome explanation.

Furthermore, various operations may be described as multiple discrete steps performed in a manner that is helpful for understanding embodiments of the present invention. However, the order of description should not be construed as to imply that these operations need be performed in the order they are presented, nor that they are even order dependent, unless otherwise indicated. Moreover, repeated usage of the phrase "in one embodiment" does not necessarily refer to the same embodiment, although it may. It is noted that disclosed embodiments need not be construed as mutually exclusive embodiments, since aspects of such disclosed embodiments may be appropriately combined by one skilled in the art depending on the needs of a given application.

FIG. 1 illustrates a fragmentary cross-sectional view of one non-limiting embodiment of a disclosed rotor structure 100, as may be used in industrial applications involving turbomachinery, such as without limitation, compressors (e.g., centrifugal compressors, etc.).

In one disclosed embodiment, a tie bolt 102 extends axially between a pressurized (e.g., relatively high pressure) process side and an atmospheric pressure side of the turbomachine. As would be readily appreciated by one skilled in the art, a stub shaft $\mathbf{104}_1$ is fixed to a first end of tie bolt 102. A second stub shaft $\mathbf{104}_2$ is fixed to a second end of tie bolt 102. Second end of tie bolt 102 is axially opposite the first end of tie bolt 102.

The description will proceed in connection with a first venting/sealing arrangement arranged proximate the first end of tie bolt 102, as illustrated in FIG. 1. As would be appreciated by one skilled in the art, a second venting/sealing arrangement is arranged proximate the second end of tie bolt 102. Since the first and second venting/sealing arrangements comprise identical structural and/or operational relationships in order to avoid pedantic and burdensome repetition the description will proceed in connection with just the first venting/sealing arrangement arranged proximate the first end of tie bolt 102, as illustrated in FIG. 1. Essentially, the first and second venting/sealing arrangements would exhibit structural symmetry with respect to one another about a radial plane 101 that cuts the longitudinal axis of the turbomachine.

Figure 2:
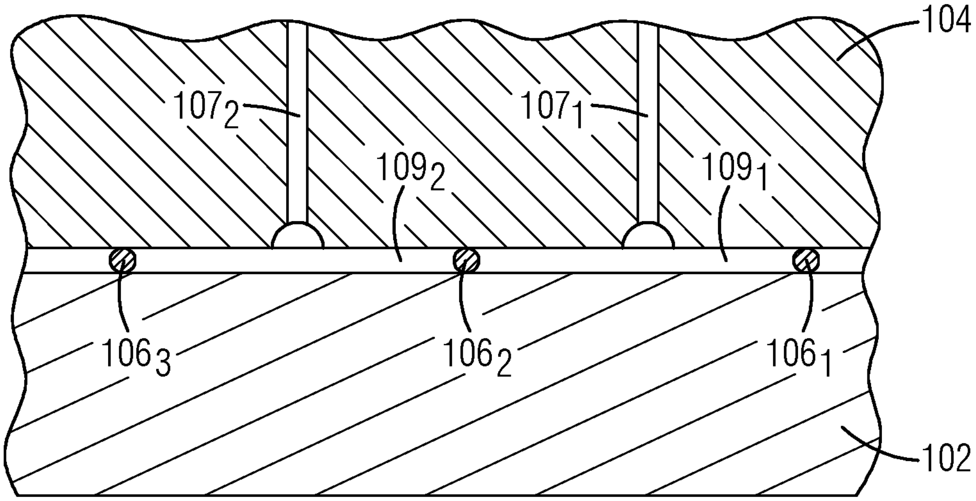
FIGS. 2 through 5 respectively illustrate zoomed-in views of a portion of the cross-sectional view shown in FIG. 1 that may be used for illustrating and describing certain non-limiting structural and/or operational relationships of features in the disclosed rotor structure.

In one disclosed embodiment, a plurality of axially spaced apart annular seals 106, such as annular seals $\mathbf{106}_1$, $\mathbf{106}_2$ through $\mathbf{106}_n$ (e.g., O-rings) may be arranged about a segment of tie bolt 102 in correspondence with a radially-inward segment 108 of respective stub shaft 102. In FIG. 2, the number of illustrated annular seals is equal to 5 and so in this example n=5. It will be appreciated that the foregoing should be construed as one non-limiting example.

It will be further appreciated that each respective neighboring seal pair of the plurality of axially spaced apart annular seals 106 defines sealing sides of a respective chamber 109 of a plurality of axially sequential chambers, such as chambers $\mathbf{109}_1$, $\mathbf{109}_2$, as seen in FIG. 2, disposed between the process side and the atmospheric pressure side of the turbomachine. In the foregoing example, four axially sequential chambers would be defined by annular seals $\mathbf{106}_1$, $\mathbf{106}_2$ through $\mathbf{106}_5$. For the sake of simplicity of illustration just two of such chambers are shown in FIGS. 2-5.

In the general case, the relationship that defines the number of chambers formed by an n number of annular seals is n−1. Accordingly, if the number of annular seals is 5, then the number of chambers is n−1=4.

A plurality of conduits 107, such as conduits $\mathbf{107}_1$, $\mathbf{107}_2$ through $\mathbf{107}_{n-1}$ (e.g., drilled or otherwise constructed through the tie bolt) extend from a radially-outward segment 111 of the respective stub shaft 102 through the stub shaft to communicate with the plurality of axially sequential chambers 109 disposed between the process side and the atmospheric side of the turbomachine. In the foregoing example, four conduits would communicate with the four chambers defined by annular seals $\mathbf{106}_1$, $\mathbf{106}_2$ through $\mathbf{106}_5$.

In one disclosed embodiment, the plurality of conduits 107 may alternate between a first conduit $\mathbf{107}_1$ fluidly coupled at the radially-outward segment of the respective stub shaft 102 to receive a sealing fluid and a second conduit $\mathbf{107}_2$ fluidly connected at the radially-outward segment of the respective stub shaft to a venting outlet. It will be appreciated that the source of the sealing fluid and the venting outlet may be obtained by way of a dry fluid seal system 130, such as is commonly used in process gas centrifugal compressors. Without limitation, dry fluid seal system 130 may involve a tandem seal configuration involving stationary and rotatable sealing elements. As would be appreciated by one skilled in the art, dry fluid seal system 130 may be disposed about the radially-outward segment 111 of the respective stub shaft 102 and, as noted above, may be used as the source of the sealing fluid and may be further used to provide a venting mechanism to a flow that may comprise the incipient leakage of the process fluid.

In one non-limiting embodiment, a plurality of impeller stages 140 (just one is illustrated in FIG. 1) may be disposed between stub shafts $\mathbf{104}_1$ and $\mathbf{104}_2$. The plurality of impeller stages being supported by tie bolt 102 using any affixing technique appropriate for a given application. In one non-limiting embodiment, respective joint structures 150 may be arranged to couple contiguous impeller stages to one another. In one non-limiting embodiment, the respective joint structures 150 may, without limitation, comprise joining/stacking rotating elements, such as Hirth joint structures, Gleason curvic joints, and piloted rabbet or spigot-fit joints, each of which, as would be appreciated by one skilled in the art may center parts and transmit load but may also leak gas through the joint area.

In one non-limiting embodiment, a computerized leakage monitor 160 may be coupled to second conduit/s (e.g., venting conduits $\mathbf{107}_2$, $\mathbf{107}_3$, etc.) to monitor a presence of any incipient leakage of process fluid in any of such venting conduits.

FIGS. 2 through 5 respectively illustrate zoomed-in views of a portion of the cross-sectional view shown in FIG. 1 that may be used for illustrating and describing certain non-limiting structural and/or operational relationships of features in the disclosed rotor structure.

FIG. 2 illustrates an example where annular seals $\mathbf{106}_1$, $\mathbf{106}_2$ and $\mathbf{106}_3$ are intact. That is, no seal malfunction is present in any of the annular seals. In this case, no fluid flow would develop in conduits $\mathbf{107}_1$ and $\mathbf{107}_2$. This is essentially a static condition.

Figure 3:
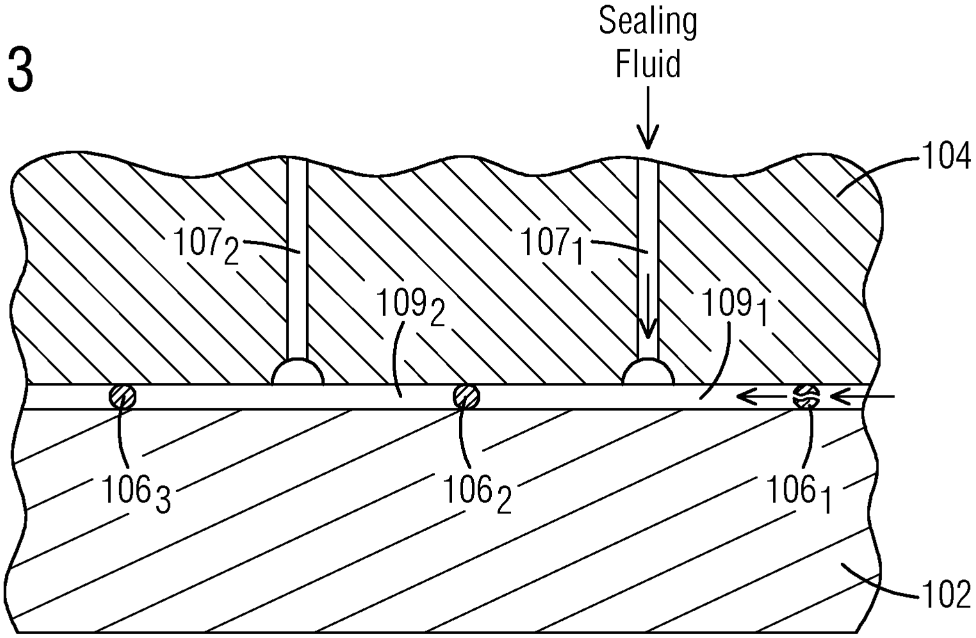

FIG. 3. illustrates an example where annular seal $\mathbf{106}_1$ is broken and annular seals $\mathbf{106}_2$ and $\mathbf{106}_3$ are intact. That is, a seal malfunction is present in annular seal $\mathbf{106}_1$. In this case, pressurized process fluid would pass through malfunctioning annular seal $\mathbf{106}_1$ into chamber $\mathbf{109}_1$; pressurized sealing fluid would flow into chamber $\mathbf{109}_1$ and this would be effective to inhibit further progress of the pressurized process fluid in chamber $\mathbf{109}_1$, provided the internal pressure of the sealing fluid is relatively larger compared to the internal pressure of the process fluid passing into chamber $\mathbf{109}_1$.

Figure 4:
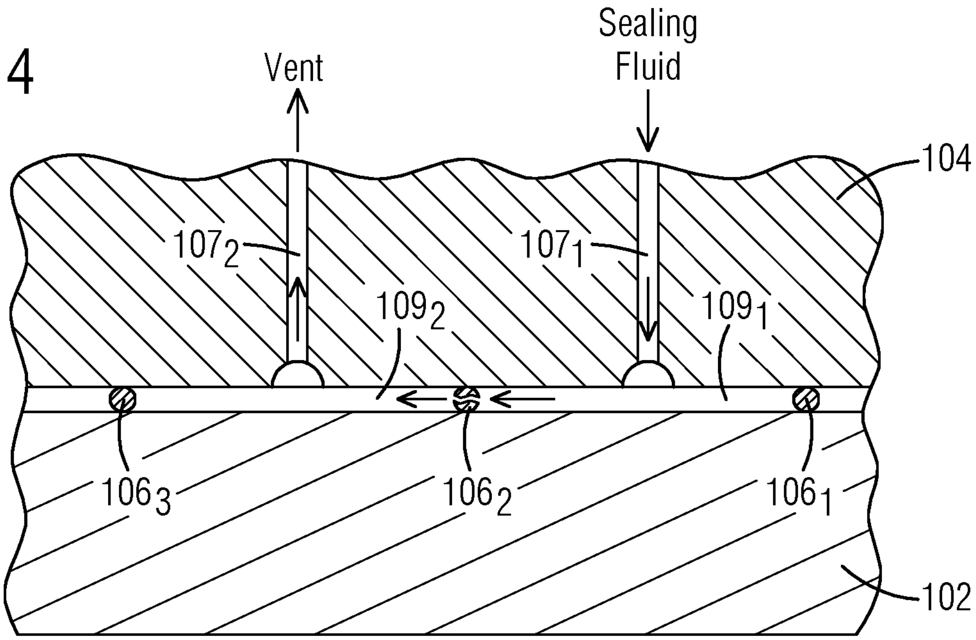

FIG. 4. illustrates an example where annular seal $\mathbf{106}_2$ is broken and annular seals $\mathbf{106}_1$ and $\mathbf{106}_3$ are intact. That is, a seal malfunction is present in annular seal $\mathbf{106}_2$. In this case, sealing fluid would pass through malfunctioning annular seal $\mathbf{106}_2$ and into chamber $\mathbf{109}_2$, effectively forming a fluid buffer zone overlapping chambers $\mathbf{109}_1$ and $\mathbf{109}_2$ with venting through conduit $\mathbf{107}_2$.

Figure 5:
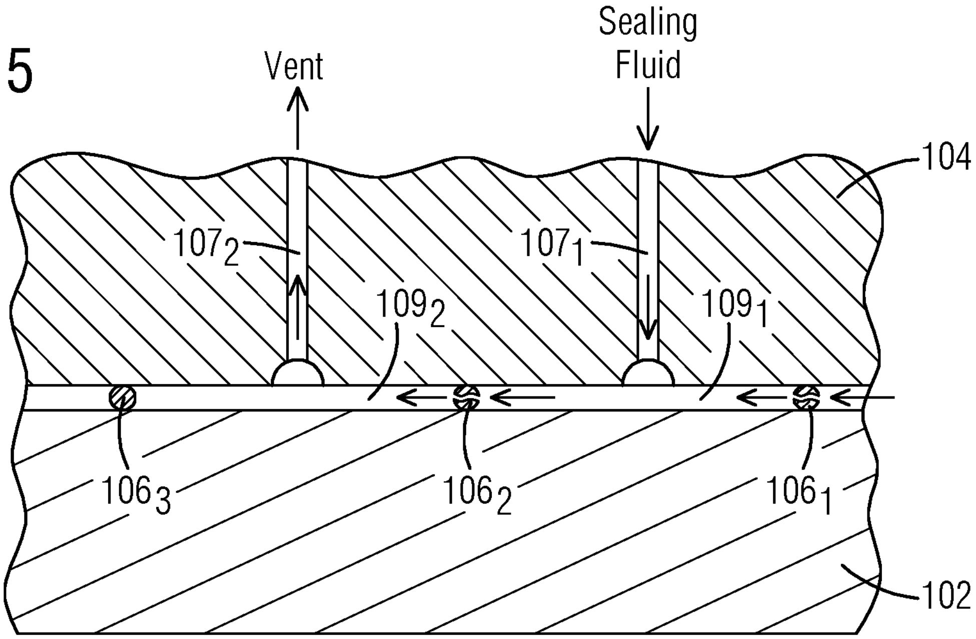

FIG. 5. illustrates an example where annular seals $\mathbf{106}_1$ and $\mathbf{106}_2$ are broken and annular seal $\mathbf{106}_3$ is intact. That is, seal malfunctions are present in annular seals $\mathbf{106}_1$ and $\mathbf{106}_2$. In this case, sealing fluid mixed with pressurized process fluid would pass through malfunctioning annular seal $\mathbf{106}_2$ and this mixture would be vented through conduit $\mathbf{107}_2$. In this example, this mixture would not advance beyond chamber $\mathbf{109}_2$.

In one non-limiting embodiment, the alternating chambers $\mathbf{109}_1$, $\mathbf{109}_2$ through $\mathbf{109}_{n-1}$ include at least one backup first chamber (e.g., the chamber connected to first conduit $\mathbf{107}_4$ fluidly coupled to receive the sealing fluid) relative to the first chamber $\mathbf{109}_1$, which is disposed downstream of the backup chamber connected to first conduit $\mathbf{107}_4$. (The term downstream is indicative of the direction of process fluid flow between the pressurized process side and the atmospheric pressure side of the turbomachine). Similarly, the alternating chambers $\mathbf{109}_1$, $\mathbf{109}_2$ through $\mathbf{109}_{n-1}$ includes at least one backup second chamber (e.g., the chamber connected to second conduit $\mathbf{107}_3$ fluidly coupled for venting) relative to a second chamber $\mathbf{109}_2$ disposed downstream of the chamber connected to second conduit $\mathbf{107}_3$. It will be appreciated that the first chamber (e.g., chamber $\mathbf{109}_1$) and the backup first chamber (e.g., chamber $\mathbf{109}_4$) is each independently arranged to receive sealing fluid, and the second chamber (e.g., chamber $\mathbf{109}_2$) and the backup chamber (e.g., chamber $\mathbf{109}_3$) is each independently arranged to permit venting, such as discussed in the context of the foregoing examples.

In operation, for example, when one or more annular seals malfunctions in a respective neighboring seal pair of the plurality of annular seals $\mathbf{106}_1$, $\mathbf{106}_2$ through $\mathbf{106}_n$, and the malfunction of the one or more annular seals leads to incipient leakage of process fluid, a first fluid flow may be established through the first conduit/s (e.g., conduits $\mathbf{107}_1$, $\mathbf{107}_4$) to convey sealing fluid into the respective chamber in communication with the first conduit/s, and/or a second fluid flow is established through the second conduit/s (e.g., conduits $\mathbf{107}_2$,$\mathbf{107}_3$) to permit venting of the respective chamber in communication with the second conduit/s.

In operation, disclosed embodiments make use of innovative venting/sealing arrangements effective for venting the tie bolt rotor so that, for example, an incipient leakage of the process fluid can be monitored. Additionally, in operation disclosed embodiments are effective to, for example, convey to the tie bolt rotor a pressurized sealing fluid effective for reducing the likelihood of process fluid escaping to the atmosphere.

While embodiments of the present disclosure have been disclosed in exemplary forms, it will be apparent to those skilled in the art that many modifications, additions, and deletions can be made therein without departing from the scope of the invention and its equivalents, as set forth in the following claims.

What is claimed is:

1. A rotor structure for a turbomachine, the rotor structure comprising:

a tie bolt that extends axially between a pressurized process side and an atmospheric pressure side of the turbomachine;

a respective stub shaft fixed to a first end of the tie bolt;

a first venting/sealing arrangement comprising:

a plurality of axially spaced apart annular seals arranged about a segment of the tie bolt in correspondence with a radially-inward segment of the respective stub shaft, wherein each respective neighboring seal pair of the plurality of axially spaced apart annular seals defines sealing sides of a respective chamber of a plurality of axially sequential chambers disposed between the process side and the atmospheric pressure side of the turbomachine; and a plurality of conduits extending from a radially-outward segment of the respective stub shaft through the stub shaft to communicate with the plurality of axially sequential chambers disposed between the process side and the atmospheric pressure side of the turbomachine, the plurality of conduits alternating between a first conduit fluidly coupled at the radially-outward segment of the respective stub shaft to receive a sealing fluid and a second conduit fluidly connected at the radially-outward segment of the respective stub shaft for venting, wherein, in response to flow of an incipient leakage of a process fluid through one or more of the plurality of axially spaced apart annular seals, a first fluid flow is established through the first conduit to convey sealing fluid into the respective chamber in communication with the first conduit, and/or a second fluid flow is established through the second conduit to permit venting of the respective chamber in communication with the second conduit.

2. The rotor structure of claim 1, wherein the plurality of axially sequential chambers disposed between the process side and the atmospheric pressure side of the turbomachine define a sequence of alternating chambers between a first chamber arranged to receive sealing fluid and a second chamber arranged to vent the incipient leakage of the process fluid.

3. The rotor structure of claim 2, wherein the plurality of axially-sequential chambers includes at least one backup first chamber relative to a first chamber disposed downstream of the at least one backup first chamber and at least one backup second chamber relative to a second chamber disposed downstream of the at least one backup second chamber, wherein the first chamber and the backup first chamber is each independently arranged to receive sealing fluid, and wherein the second chamber and the backup second chamber is each independently arranged to permit venting.

4. The rotor structure of claim 1, wherein a dry fluid seal system disposed about the radially-outward segment of the respective stub shaft comprises a source of the sealing fluid and a venting outlet for the incipient leakage of the process fluid.

5. The rotor structure of claim 1, wherein the first end of the tie bolt corresponds to the pressurized process side of the turbomachine.

6. The rotor structure of claim 1, further comprising a second stub shaft fixed to a second end of the tie bolt, the second end being axially opposite to the first end of the tie bolt;

a second venting/sealing arrangement comprising:

a further plurality of axially spaced apart annular seals arranged about a segment of the tie bolt in correspondence with a radially-inward segment of the second stub shaft, wherein each respective neighboring seal pair of the further plurality of axially spaced apart annular seals defines sealing sides of a respective chamber of a further plurality of axially sequential chambers disposed between the process side and the atmospheric pressure side of the turbomachine; and a further plurality of conduits extending from a radially-outward segment of the second stub shaft through the second stub shaft to communicate with the further plurality of axially sequential chambers disposed between the process side and the atmospheric pressure side of the turbomachine, the further plurality of conduits alternating between a first conduit fluidly coupled at the radially-outward segment of the second stub shaft to receive further sealing fluid and a second conduit fluidly connected at the radially-outward segment of the second stub shaft for venting, wherein, in response to flow of a further incipient leakage of the process fluid through one or more of the further plurality of axially spaced apart annular seals, a first fluid flow is established through the first conduit of the further plurality of conduits to convey the further sealing fluid into the respective chamber of the further plurality of axially sequential chambers in communication with the first conduit, and a second fluid flow is established through the second conduit of the further plurality of conduits connected to permit venting of the respective chamber in communication with the second conduit.

7. The rotor structure of claim 6, wherein the second end of the tie bolt corresponds to the atmospheric pressure side of the turbomachine.

8. The rotor structure of claim 6, further comprising a plurality of impeller stages disposed between the stub shafts, the plurality of impeller stages supported by the tie bolt.

9. The rotor structure of claim 8, further comprising respective joint structures arranged to couple contiguous impeller stages to one another.

10. The rotor structure of claim 9, wherein the respective joint structures comprise respective Hirth joint structures.

11. The rotor structure of claim 1, further comprising a computerized leakage monitor coupled to the second conduit to monitor a presence of the incipient leakage of the process fluid.

12. A centrifugal compressor comprising the rotor structure of claim 1.

* * * * *